United States Patent [19]
Oguchi

[11] 4,253,191
[45] Feb. 24, 1981

[54] STRAIGHT-THROUGH-REPEATER

[75] Inventor: Takuro Oguchi, Kawasaki, Japan

[73] Assignee: Fujitsu Limited, Tokyo, Japan

[21] Appl. No.: 15,364

[22] Filed: Feb. 26, 1979

[30] Foreign Application Priority Data

| Feb. 25, 1978 | [JP] | Japan | 53-21355 |
| Feb. 28, 1978 | [JP] | Japan | 53-22348 |
| Apr. 26, 1978 | [JP] | Japan | 53-49408 |
| Apr. 26, 1978 | [JP] | Japan | 53-49409 |

[51] Int. Cl.³ .................................. H04B 7/165
[52] U.S. Cl. ................................ 455/21; 455/23
[58] Field of Search .................. 325/1, 2, 7, 9, 10, 325/11, 17, 62, 63, 123, 419, 478; 455/7, 20, 21, 22, 23, 42, 71, 118, 110, 113; 370/12

[56] References Cited

U.S. PATENT DOCUMENTS

| 2,296,384 | 9/1942 | Hansell | 325/2 |
| 2,747,083 | 5/1956 | Guanella | 325/7 |
| 3,201,691 | 8/1965 | Lyon | 325/7 X |
| 4,035,727 | 7/1977 | Ishii | 325/174 |
| 4,061,979 | 12/1977 | Walker et al. | 325/419 |
| 4,134,068 | 1/1979 | Richardson | 325/7 |

Primary Examiner—Benedict V. Safourek
Attorney, Agent, or Firm—Staas & Halsey

[57] ABSTRACT

The present invention discloses a straight-through-repeater which relays a frequency-modulated microwave signal. The straight-through-repeater is basically comprised of a phase-locked loop circuit located between receiving and transmitting antennas of the repeater. The phase-locked loop circuit has a demodulating capability for reproducing a baseband signal, a power amplifying capability, a very narrow filtering capability, an automatic gain controlling capability and an amplitude limiting capability. The repeater is further comprised of a means for suppressing a step-out of synchronism occurring in the phase-locked loop circuit.

27 Claims, 11 Drawing Figures

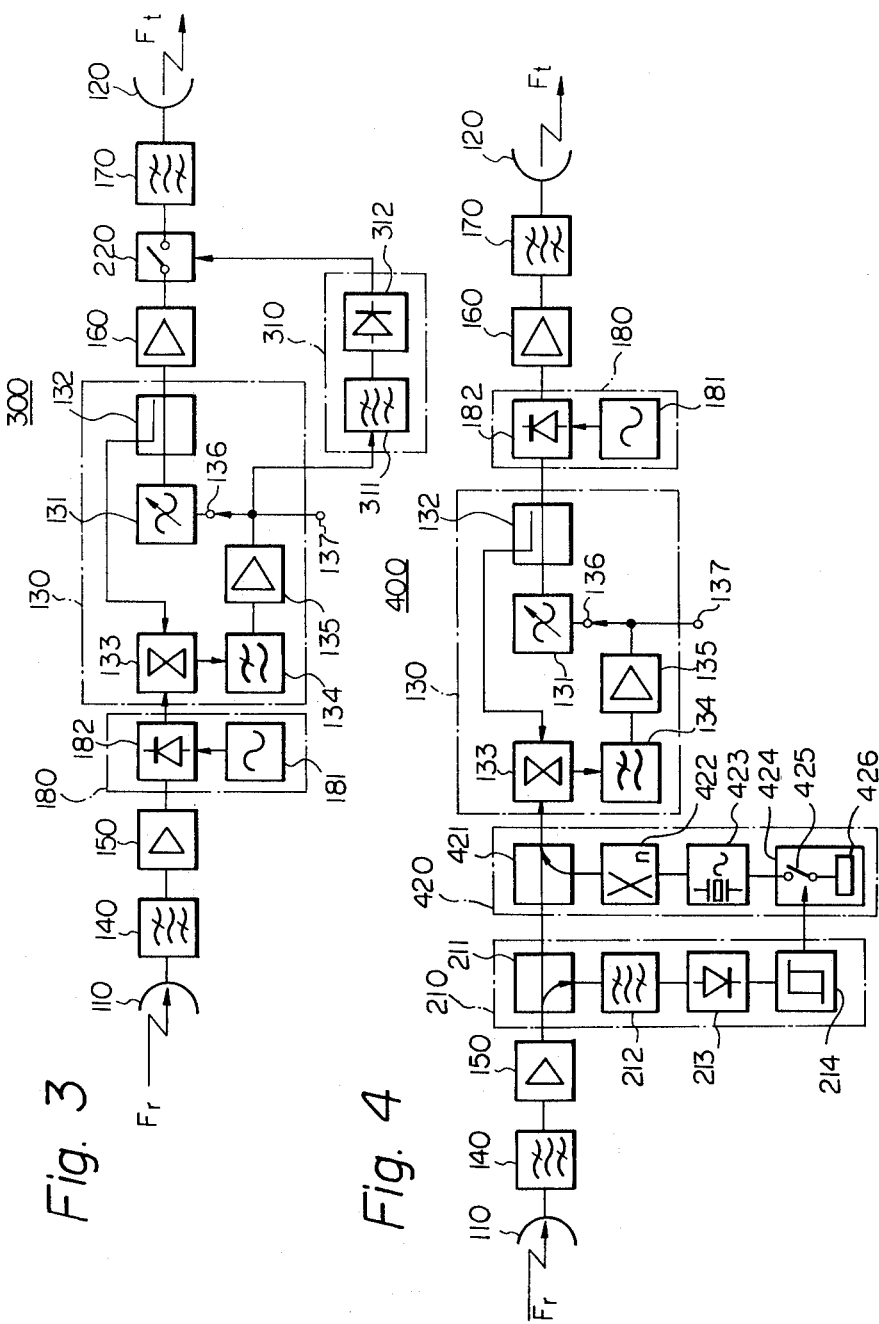

Fig. 10

STRAIGHT-THROUGH-REPEATER

BACKGROUND OF THE INVENTION

1. Field of the Invention

The present invention relates to a straight-through-repeater, and more particularly relates to a straight-through-repeater which relays frequency-modulated microwave signal.

2. Description of the Prior Art

With the progress in microwave semiconductor technology, a microwave straight-through-repeater has come into practical use. Such microwave semiconductor has been reported in, for example 7th EMC (Europe Microwave Conference) CS2, pages 382 through 386, entitled "A 7 GHz Band GaAs FET Amplifier For the Straight-Through-Repeater". This repeater relays a received microwave signal after direct amplification thereof without converting it into a conventional intermediate frequency signal. Therefore, it is not necessary for the repeater to possess a conventional local oscillator therein which converts the received microwave signal into the intermediate frequency signal. Thus, the repeater may be very simple in construction.

However, although the straight-through-repeater has the advantage that it is simple in construction, the repeater simultaneously has the disadvantages recited in following items (a) through (d).

(a) It is impossible to pick out a baseband signal from the received microwave signal. In a typical repeater, that is a non-straight-through-repeater, it is very easy to obtain the baseband signal from the received microwave signal, due to the presence of the intermediate frequency signal therein, by means of a simple intermediate frequency signal demodulator. Accordingly, in the straight-through-repeater, it is impossible to reproduce the so-called order wire signal therefrom, which order wire signal has to be provided in the repeater for use in emergencies, such as trouble with or an accident at a repeater station. Further, since the baseband signal can not be reproduced in the repeater, it is impossible to create another microwave communication route branched from the repeater.

(b) The straight-through-repeater is relatively high in cost. This is due to the fact that the aforesaid microwave semiconductor having a relatively high power amplifying capability, is presently still high in cost.

(c) The straight-through-repeater comprising the microwave semiconductor mentioned in the item (b), above, should also be provided with a very narrow microwave band filtering capability. However, it is difficult for this repeater to realize such filtering capability in a cheap and simple manner.

(d) The straight-through-repeater comprising the microwave semiconductor mentioned in the item (b), above, should also be provided with a so-called automatic gain controlling capability and/or amplitude limiting capability. However, it is difficult for this repeater to realize such automatic gain controlling capability and/or amplitude limiting capability in a cheap and simple manner.

SUMMARY OF THE INVENTION

Therefore, it is an object of the present invention to provide a straight-through-repeater which relays a frequency-modulated microwave signal, which straight-through-repeater has none of the disadvantages mentioned above.

BRIEF DESCRIPTION OF THE DRAWINGS

The present invention will be more apparent from the ensuing description with reference to the accompanying drawings wherein:

FIG. 3 is a block diagram illustrating the structure of a third embodiment according to the present invention, in which a means for suppressing a step-out of synchronism is further included in the repeater 100 illustrated in FIG. 1;

FIG. 4 is a block diagram illustrating the structure of a fourth embodiment according to the present invention, in which a means for suppressing a step-out of synchronism is further included in the repeater 100 illustrated in FIG. 1;

FIG. 10 is an example of a detailed circuit diagram corresponding to the block diagram illustrated in FIG. 5; and;

DESCRIPTION OF THE PREFERRED EMBODIMENTS

Figure 1:
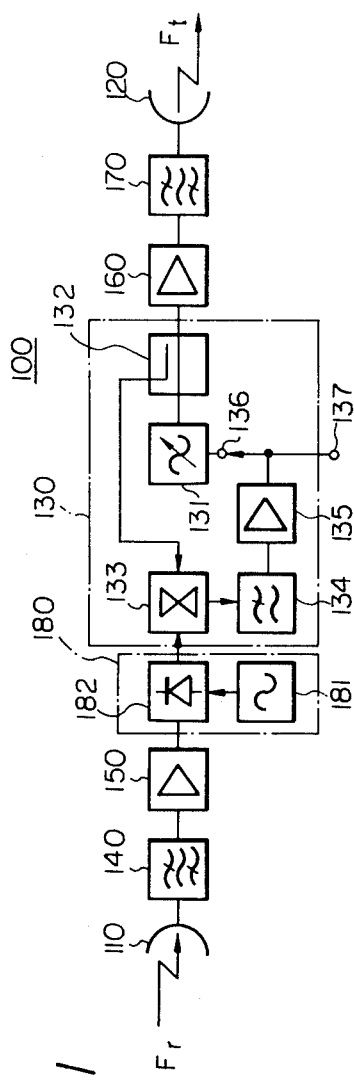
FIG. 1 is a block diagram illustrating the structure of a principal embodiment according to the present invention.

Referring to FIG. 1, there is illustrated a block diagram for the structure of a principal embodiment according to the present invention, in which a frequency modulated microwave signal $F_r$, having a frequency $f_r$, is received by a receiving antenna 110. The signal $F_r$ is, then, transmitted from a transmitting antenna 120 as a frequency modulated microwave signal $F_t$, having a frequency $f_t$, without converting the microwave signal $F_r$ into conventional intermediate frequency signal. The essential feature of the straight-through-repeater 100 according to the present invention is represented by a block 130 which is comprised of a well-known phase-locked loop (PLL) circuit and is located between the antennas 110 and 120. The received microwave signal $F_r$ is applied to an input amplifier 150 by way of a band pass filter 140. The filter 140 removes unnecessary waves other than the microwave signal $F_r$ having the desired frequency $f_r$ and its near-by frequencies. The microwave signal $F_r$ picked out from the filter 140 is amplified by the amplifier 150 and, then, applied to the phase-locked loop circuit 130, by way of a frequency shifter 180, if necessary. The amplifier 150 is provided with an automatic gain control capability and/or amplitude limiting capability, if necessary. The microwave output from the phase-locked loop circuit 130 is further amplified by a booster amplifier 160 and is, then, transmitted from the antenna 120 as the microwave signal $F_t$, by way of a band pass filter 170. The filter 170 is useful for eliminating spurious radiation, such as microwaves having harmonic distortion generated in the amplifier 160. The amplifier 160 may be eliminated from the repeater 100, if the level of the output from the phase-locked loop circuit 130 reaches a desired level of the microwave signal $F_t$ to be transmitted. The above mentioned frequency shifter 180 is employed in the repeater to avoid the occurrence of interference due to the coupling of the microwave signal to be transmitted from the antenna 120 and the microwave signal to be received by the antenna 110. The frequency shifter 180 is comprised of a frequency shifting oscillator 181 and a frequency shifting mixer 182. The oscillator 181 produces an oscillating output having a frequency corresponding to a difference frequency between the frequencies $f_r$ and $f_t$. The mixer 182 mixes the oscillating output having said difference frequency with the received microwave signal having the frequency $f_r$. Then, the received microwave signal is converted to a microwave signal having the frequency $f_t$, which microwave signal corresponds to the microwave signal $F_t$ to be transmitted. It should be noted that the frequency shifter 180 may alternatively be located between the circuit 130 and the booster amplifier 160, such as shown in FIG. 4. It should also be noted that such frequency shifter can be eliminated from the repeater 100, if not required, for example in a case where the aforesaid occurrence of interference between the microwave signal to be transmitted and the microwave signal to be received is not expected to occur in the repeater 100.

As mentioned above, the essential feature of the repeater 100 is represented by the phase-locked loop circuit 130. The phase-locked loop circuit 130 is comprised of a voltage controlled oscillator 131, a branching directional coupler 132, a phase comparator 133, a loop filter 134 and a low frequency amplifier 135. The operation of the circuit 130 is as follows. The microwave output to be applied to the amplifier 160 from the oscillator 131 is branched by means of the coupler 132 and, then, is applied to one input of the phase comparator 133. At the same time, the amplified microwave input from the amplifier 150 is applied to the other input thereof, by way of the frequency shifter 180. The output from the phase comparator 133 is supplied to a voltage control terminal 136 by way of the loop filter 134 and the amplifier 135. The output from the comparator 133 represents the difference of phases between the microwave output supplied from the oscillator 131 and the microwave input supplied from the amplifier 150. The output from the comparator 133 representing the difference of the phases has a relatively low frequency. The loop filter 134 is a low pass filter and picks out a low frequency signal. The low frequency signal is amplified by the amplifier 135 and, then, applied to the terminal 136 of the oscillator 131. At first the oscillator oscillates with a free running frequency. Next, when microwave input from the amplifier 150 is applied to the comparator 133, the oscillator oscillates so as to follow the above mentioned microwave input, in accordance with the variation of the voltage level appearing at the terminal 136. It is important to notice that this variation of the voltage level corresponds to the baseband signal contained in the received microwave signal $F_r$. This is due to the fact that this signal $F_r$ is a frequency-modulated microwave signal which is modulated by the baseband signal. As a result, in the repeater 100 of the present invention, the baseband signal can be obtained at the voltage control terminal 136. This baseband signal can also be produced from a baseband signal providing terminal 137 of the straight-through-repeater 100. Thus, the aforesaid disadvantage, mentioned in the item (a), of the straight-through-repeater of the prior art can be obviated by employing the phase-locked loop circuit 130. Accordingly, it is easy to reproduce the aforesaid order wire signal from the terminal 137. Further, since the baseband signal can be reproduced from the terminal 137, it is easy to create another microwave communication route (not shown) branched from the repeater 100.

The phase-locked loop circuit 130 usually has relatively high power amplifying capability, because the output level of the voltage controlled oscillator 131 can be chosen independently of the input level. Accordingly, the aforesaid disadvantage, mentioned in item (b), of the straight-through-repeater of the prior art can be cancelled by employing the phase-locked loop circuit 130.

Generally, it is technically very difficult for the ordinary band pass filter 140 to provide a very narrow microwave band filtering capability. However, both the loop filter 134 and the oscillator 131 are very useful for providing a capability which is substantially the same as the above mentioned very narrow microwave band filtering capability. Thus, the aforesaid disadvantage, mentioned in item (c), of the straight-through-repeater of the prior art can be cancelled by employing the phase-locked loop circuit 130.

The voltage controlled oscillator 131 can produce a microwave signal having a predetermined constant voltage level, regardless of the variation of the voltage level of the received microwave signal $F_r$. In other words, the voltage controlled oscillator 131 has both an equivalent automatic gain controlling capability and an equivalent level limiting capability. Therefore, the automatic gain control capability and/or amplitude limiting capability of the amplifier 150 can be realized in a cheap and simple manner. Thus, the aforesaid disadvantage, mentioned in item (d), of the straight-through-repeater of the prior art can be improved by employing the phase-locked loop circuit 130.

As mentioned above, the straight-through-repeater 100 comprising the phase-locked loop circuit 130 is very useful for simultaneously avoiding the aforementioned disadvantages. However, the straight-through-repeater 100 comprising the phase-locked loop circuit 130 has a serious problem. The problem resides in the so-called step-out of synchronism occurring in the phase-locked loop circuit. If the so-called acquisition of synchronism is performed in the phase-locked loop circuit, this phase-locked loop circuit will produce a normal oscillating signal which follows accurately the received microwave signal. In a case where the step-out of synchronism occurs in the phase-locked loop circuit, this circuit will produce an abnormal oscillating signal having a free running frequency. This abnormal oscillating signal exerts a deleterious effect on the microwave communication system. In the ordinary microwave frequency multiplex communication system, each of the repeater stations arranged at intervals of several tens of kilometers relays a transmitted microwave signal $F_r$. The signal $F_r$ contains n number of RF channels. The n channels are defined by respective carrier frequencies, such as $f_{r1}$, $f_{r2}$, $f_{r3}$ ... $f_{rn}$. Each of the n number of the repeaters for respective channels has a construction which is similar to the straight-through-repeater 100. One of the repeaters which relays a microwave signal having a carrier frequency, for example $f_{r1}$, is comprised of identical members 130 through 180 as illustrated in FIG. 1. However, the band pass filters similar to the filters 140 and 170 should pick out only the microwave signal having the carrier frequencies $f_{r1}$ and $f_{t1}$, respectively. Also, the voltage controlled oscillator similar to the oscillator 131 should produce an output having a frequency of $f_{t1}$ and its near-by frequencies. Another repeater which relays a microwave signal having the carrier frequency, for example $f_{r3}$, is also comprised of identical members 130 through 180, as illustrated in FIG. 1. However, the band pass filters similar to the filters 140 and 170 should pick out only the microwave signal having the carrier frequencies $f_{r3}$ and $f_{t3}$, respectively. Also, the voltage controlled oscillator similar to the oscillator 131 should produce an output having frequency of $f_{t3}$ and its near-by frequencies. Suppose that the above mentioned step-out of synchronism occurs in any one of the n number of repeaters, then the corresponding voltage controlled oscillator similar to the oscillator 131 produces an output not having the specified frequency, but a free running frequency. In this case, the corresponding one of the multiplex communication channels becomes out of order due to said step-out of synchronism. To make the matter worse, the corresponding one of the multiplex communication channels also cause the remaining normal multiplex communication channels to be out of order due to said free running frequency of the corresponding voltage controlled oscillator. Consequently, the straight-through-repeater 100 comprising the phase-locked loop circuit 130 should further contain a means for suppressing the step-out of synchronism occurring in the phase-locked loop circuit 130. The means for suppressing the step-out of synchronism may be realized in various ways. However, this means has to be comprised of at least two means. A first means is a means for detecting a source which causes the respective step-out of synchronism. A second means is a means for preventing a transmission of an undesired microwave signal in respective channels caused by the free running of the respective voltage controlled oscillator due to said step-out of synchronism. Regarding said first means, the source may be as follows. Firstly, the source may be a decrease of level of the received microwave signal of a corresponsing channel due to the occurrence of so-called fading. Secondly, the source may be emergencies, such as trouble with or accident in the respective channel. Usually, the former source is created very frequently. Accordingly, said first means should be a means for detecting a decrease in the level of the received microwave signal to be relayed.

Figure 2:
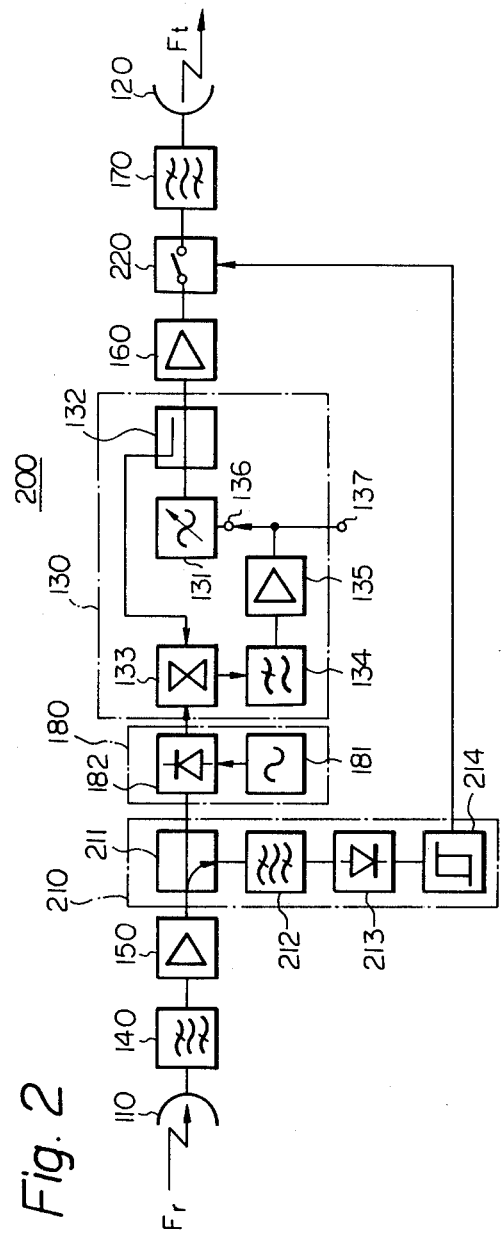
FIG. 2 is a block diagram illustrating the structure of a second embodiment according to the present invention, in which a means for suppressing a step-out of synchronism is further included in the repeater 100 illustrated in FIG. 1.

Referring to FIG. 2, there is illustrated a block diagram for the structure of a second embodiment according to the present invention, in which the means for suppressing the step-out of synchronism is further included in the straight-through-repeater 100 illustrated in FIG. 1. The members illustrated in FIG. 2 and the members illustrated in FIG. 1 which are designated by the same numerals and symbols are identically the same. Accordingly, the members designated by the reference numerals 210 and 220 are newly employed in the repeater 100 illustrated in FIG. 1. The above mentioned means for suppressing the step-out of synchronism occurring in the phase-locked loop 130, is comprised of a means 210 for detecting a decrease in the level of the received microwave signal $F_r$ to be relayed and a means 220 for preventing a transmission of an undesired microwave signal from the circuit 130. The means 210 is specifically a level detector. The means 220 is specifically a switching device. When the level of the received microwave signal $F_r$ decreases due to, for example, fading, the phase comparator 133 loses one of the inputs to be compared. Therefore, the voltage controlled oscillator 131 starts producing a microwave output having a free running frequency and, thereafter, the step-out of synchronism will occur in the circuit 130. The level detector 210 operates so as to detect a decrease in the level of the received microwave signal $F_r$. In a case where the level detector 210 detects a decrease, this detector 210 provides a control signal to the switching device 220, so as to make this switching device 220 non-conductive. Thus, the undesired microwave signal generated in the circuit 130, due to the step-out of synchronism, is prevented from being provided from the switching device 220. As a result, even though the step-out of synchronism occurs in the circuit 130, the remaining normal channels, other than the corresponding channel, of the microwave multiplex communication system can not be forced to become out of order.

The level detector 210 may be comprised of a branching directional coupler 211, a band pass filter 212, a rectifying diode 213 and a hysteresis circuit 214. The switching device 220 may be comprised of a pin diode type of microwave switch. Regarding the level detector 210, the coupler 211 branches a part of the microwave signal input to be applied to the circuit 130. The branched microwave signal input is applied to a band pass filter 212. The band pass filter 212 picks out only the branched microwave signal input having a center frequency of the corresponding channel. Accordingly, this filter 212 has to be a very narrow band pass filter. The filtered microwave signal input is then applied to the diode 213, whereby the level of the filtered microwave signal is detected. Whether the detected level is over or under a predetermined threshold level, is detected by the hysteresis circuit 214. When the detected level is over the threshold level, that is the normal condition, the switching device 220 is closed. Contrary to this, when the detected level is under the threshold level, the phase comparator 133 can not produce a normal difference signal of phases between the microwave output branched from the oscillator 131 and the microwave input supplied from the amplifier 150. Accordingly, the set-out of synchronism occurs in the circuit 130 and, at the same time, an undesired microwave signal is generated therein, which undesired microwave signal has a free running frequency. In this case, since the detected level is under the threshold level, the hysteresis circuit 214 causes the switching device 220 to become non-conductive. Thus, the undesired microwave signal is prevented from being provided to the band pass filter 170, and accordingly, to the transmitting antenna 120. The hysteresis circuit 214 has hysteresis characteristics between the input level and output level thereof. Generally, a relatively high frequency signal is superimposed onto the envelop of the detected level from the diode 213. The relatively high frequency signal corresponds to variations in the level of the received microwave signal $F_r$, in accordance with, for example the variations of conditions in the atmospheric path through which the microwave signal $F_r$ has been transmitted. Therefore, if the circuit 214 has no hysteresis with respect to the threshold level but a constant threshold level, the switching device 220 will be caused to become conductive and non-conductive alternately, with a frequency of said relatively high frequency signal. In order to avoid the alternating switching of the switching device 220 and, also to operate the switching device 220 smoothly in accordance with the change of the detected level, the hysteresis circuit 214 is employed in the level detector 210. This hysteresis circuit 214 may be comprised of a well-known Schmitt trigger circuit. The switching device 220 may be comprised of a transfer switch (not shown), if necessary. The transfer switch can pass two microwave signals alternatively, under the control of the level detector 210. A first microwave signal corresponds to the microwave signal output from the circuit 130 when it operates normally. A second microwave signal corresponds to a microwave signal having a carrier frequency of the corresponding channel, which microwave signal is produced from an additional microwave oscillator (not shown). The second microwave signal is transmitted from the antenna 120 when the set-out of synchronism occurs in the circuit 130. The second microwave signal is then received by a next repeater and, then it will be noticed by the next repeater that the preceding repeater 200 is out of order.

Referring to FIG. 3, there is illustrated a block diagram for the structure of a third embodiment according to the present invention, in which the means for suppressing the step-out of synchronism is further included in a Straight-through-repeater 100 illustrated in FIG. 1. The members illustrated in FIG. 3 and the members illustrated in FIG. 2 which are designated by the same numerals and symbols are identically the same. In the third embodiment, a means 310 for detecting the decrease in the level of the received microwave signal to be relayed, is employed in the repeater 300 instead of the corresponding means 210 illustrated in FIG. 2. The means 310 is specifically a pilot signal detector. Generally, the pilot signal is contained in the microwave signal to be transmitted and is utilized for inspecting whether or not the microwave channel is working normally. The baseband signal and also the pilot signal having a frequency, for example 8.5 MHz, modulate the carrier microwave in the frequency-modulation mode. Since the baseband signal is demodulated in the phase-locked loop circuit 130, the pilot signal is also demodulated in the phase-locked loop circuit 130. When the demodulated pilot signal appears at the output of the amplifier 135, it indicates that the circuit 130 is operating normally. If the demodulated pilot signal does not appear at the output of the amplifier 135, it indicates that the circuit is not operating normally, that is, the step-out of synchronism may occur in the circuit 130. The pilot signal usually has a constant specified voltage level and a constant specified frequency, while the voltage level and the frequency of the baseband signal always change in accordance with information to be transmitted. Therefore, the decrease of level of the received microwave signal $F_r$ can be detected with high degree of accuracy by means of a pilot signal passing a filter 311 and a rectifying diode 312, both comprised in the pilot signal detector 310. When the pilot signal appears at the output of the diode 312, the switching device 220 is caused to be conductive, while when pilot signal disappears, due to the decrease in the level of the received microwave signal $F_r$, the switching device 220 is caused to be non-conductive. Thus, undesired microwave signal output is not provided from the switching device 220. The advantage of the repeater 300 resides in the fact that the pilot signal detector 310 can determine very quickly the time when the switching device 220 must be opened and also can determine very quickly the time when the switching device 220 must be closed. As a result, the repeater 300 can minimize the period of time the corresponding microwave channel is held idle.

Referring to the FIG. 4, there is illustrated a block diagram for the structure of a fourth embodiment according to the present invention, in which a means for suppressing the step-out of synchronism is further included in the straight-through-repeater 100 illustrated in FIG. 1. The members illustrated in FIG. 4 and the members illustrated in FIG. 2 which are designated by the same numerals and symbols are identically the same. In the fourth embodiment, a means 420 for preventing a provision of an undesired microwave signal from the circuit 130, is employed in the repeater 400 instead of the means 220 illustrated in FIG. 2. The means 420 is specifically a microwave generator which produces a dummy microwave output having the same frequency as the carrier frequency defining the corresponding communication channel. The microwave generator 420 is comprised of a directional coupler 421, a multiplier 422, a crystal oscillator 423 and an activating means 424 for activating the crystal oscillator 423. The activating means 424 may be comprised of a switch 425 and a voltage source 426. When the level of the received microwave signal $F_r$ is over the desired level, the switch 425 is caused to be non-conductive. At the same time, the signal $F_r$ is directly applied to the circuit 130. In this case, no step-out of synchronism in the circuit 130 will occur. If the level of the received microwave signal $F_r$ decreases, the step-out of synchronism is expected to occur. However, the aforesaid level detector 210 detects the decrease in the level of the signal $F_r$, and the level detector 210 causes the switch 425 to be conductive. Then, voltage is supplied from the voltage source 426 to the crystal oscillator 423. Thereafter, the crystal oscillator 423 starts producing an output having a relatively low frequency. Since the oscillator 423 is a low frequency oscillator, it may be low in cost. The frequency of the output from the oscillator 423 is multiplied by means of the multiplier 422 so as to convert the frequency of the output from the oscillator 423 to a frequency equal to the frequency of the received microwave signal $F_r$. Consequently, the circuit 130 can still operate normally by receiving said dummy microwave output having a relatively high voltage level from the microwave generator 420, instead of the received microwave signal $F_r$ which now has relatively low voltage level. Thus, no step-out of synchronism in the circuit 130 is expected to occur. Further, the dummy microwave signal $F_t$ is still radiated from the antenna 120 to the next repeater. The next repeater receives the dummy microwave signal $F_t$ and will protect the succeeding repeater from being step-out of synchronism. The advantages of this embodiment reside in the following facts. Firstly, the order wire signal may also be transmitted by modulating the oscillator 423 to the next repeater. Secondly, the circuit 130 can very quickly be again subjected to the original microwave signal $F_r$ when the signal $F_r$ recovers to a microwave signal having a relatively high voltage level. This is because, since the voltage oscillator 131 continues oscillating with a frequency which is substantially the same as the carrier frequency of the microwave signal $F_r$, the acquisition of synchronism is performed very quickly in the circuit 130. Thirdly, the aforesaid additional microwave oscillator is not required, which oscillator produces the dummy microwave signal $F_t$. This is because the microwave generator 420 can also operate as the above mentioned additional microwave oscillator. Lastly, said switching device 220 can be substituted for the microwave generator 420. It should be noted that the switching device 220 to be employed for transferring the microwave signal without any distortion, is usually very high in cost.

Figures 5, 6:
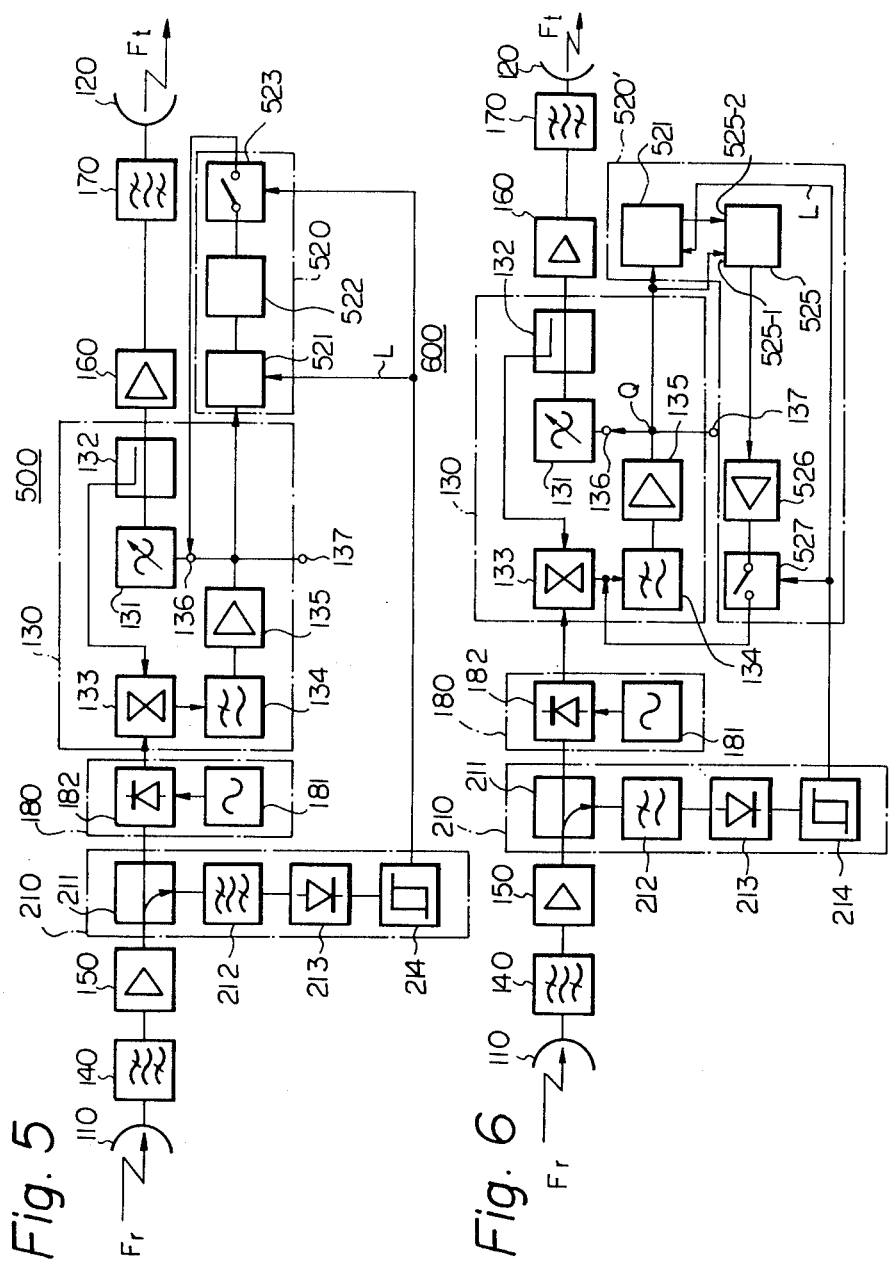
FIG. 5 is a block diagram illustrating the structure of a fifth embodiment according to the present invention, in which a means for suppressing a step-out of synchronism is further included in the repeater 100 illustrated in FIG. 1.
FIG. 6 is a block diagram illustrating the structure of a sixth embodiment according to the present invention, which has a modified circuit arrangement with respect to the fifth embodiment illustrated in FIG. 5.

Referring to FIG. 5, there is illustrated a block diagram for the structure of a fifth embodiment according to the present invention, in which a means for suppressing the step-out of synchronism is further included in the straight-through-repeater 100 illustrated in FIG. 1. The members illustrated in FIG. 5 and members illustrated in FIG. 2 which are designated by the same numeral and symbols are identically the same. In the fifth embodiment, a means 520 for preventing the transmission of an undesired microwave signal from the circuit 130, is employed in the repeater 500, instead of the means 220 illustrated in FIG. 2. The means 520 is specifically a frequency fixing circuit for the phase-locked loop circuit 130. In other words, the frequency fixing circuit 520 prevents the voltage controlled oscillator 131 from producing a microwave output having a free running frequency, when the step-out of synchronism occurs in the circuit 130. When the level of the received microwave signal $F_r$ is over the desired level, a switch 523 in the circuit 520 continues to be non-conductive. At this time, the circuit 520 is not incorporated with the circuit 130, and the circuit 130 operates normally. When the level of the received microwave signal $F_r$ is under the desired level, the step-out of synchronism is expected to occur in the circuit 130. Then, the level detector 210 detects the decrease of the level of the signal $F_r$, and causes the switch 523 to be conductive. In this case, a fixed level of voltage is supplied from a fixed voltage generator 522 in the circuit 520 to the voltage control terminal 136. Therefore, the voltage controlled oscillator 131 produces a microwave output having a frequency determined by the fixed voltage which is supplied from the generator 522 by way of the conductive switch 523. Generally, the relationship between the oscillating frequency of the oscillator 131 and the voltage level at the terminal 136 thereof, is not linear due to a variation of, for example, the temperature in the oscillator 131. While, the oscillator 131 should continue to oscillate with a frequency which is equal to the last frequency, that is a frequency defined at the time the switch 523 is changed from non-conductive to conductive. Accordingly, when the level detector 210 detects the decrease of level of the signal $F_r$, the detector 210 controls, via a line L, a voltage level memory 521 in the circuit 520 to store the last voltage level which appeared at the output of the amplifier 135 immediately before the time when the level of the signal $F_r$ goes under the desired level. Then, the fixed voltage generator 522 produces a fixed voltage specified by the last voltage level by means of the memory 521. Thereafter, the voltage level appearing at the terminal 136 is subjected to the output voltage level of not the amplifier 135 but the generator 522. This is because the generator 522 has a very low output impedance compared to the output impedance of the amplifier 135. Thus, the circuit 130 produces no undesired microwave but a suspected microwave output having a constant frequency which is the same as or close to the carrier frequency defining the corresponding microwave channel. The advantages of this fifth embodiment are substantially the same as the aforesaid advantages with respect to the fourth embodiment. Further, this fifth embodiment has an advantage, compared to the fourth embodiment, that the fifth embodiment requires no crystal oscillator such as the crystal oscillator 423 of the fourth embodiment. This is because the circuit 130 itself has a function similar to the function of the crystal oscillator 423.

Referring to FIG. 6, there is illustrated a block diagram for the structure of a sixth embodiment according to the present invention, which has a modified circuit arrangement with respect to the fifth embodiment. The principle of the sixth embodiment is substantially the same as that of the fifth embodiment. Accordingly, the advantages of the sixth embodiment are same as the aforesaid advantages of the fifth embodiment. In FIG. 6, a means 520' for suppressing the step-out synchronism is comprised of the voltage level memory 521, a voltage comparator 525, an amplifier 526 and a switch 527. When the level of the received microwave signal $F_r$ decreases, the level detector 210 causes the switch 527 to be conductive and also causes, via line L', the memory 521 to store the aforesaid last voltage level. Thereafter, the voltage level appearing at a point Q is fixed to the last voltage level which is stored in the memory 521, due to the presence of a feed back loop being comprised of the comparator 525, the amplifier 526 and the switch. That is, the variation of the voltage level at the point Q is cancelled by the variation of counter voltage level with respect to said voltage level at the point Q. The voltage comparator 525 is employed in the feed back loop to produce said counter voltage level. The counter voltage level corresponds to a difference voltage between the voltage level of the output of the amplifier 135 and the last voltage level stored in the memory 521. The comparator 525 receives the former voltage level at its first input 525-1 and the latter voltage level at its second input 525-2, and then compares the two and produces the difference voltage therebetween.

Figure 7:
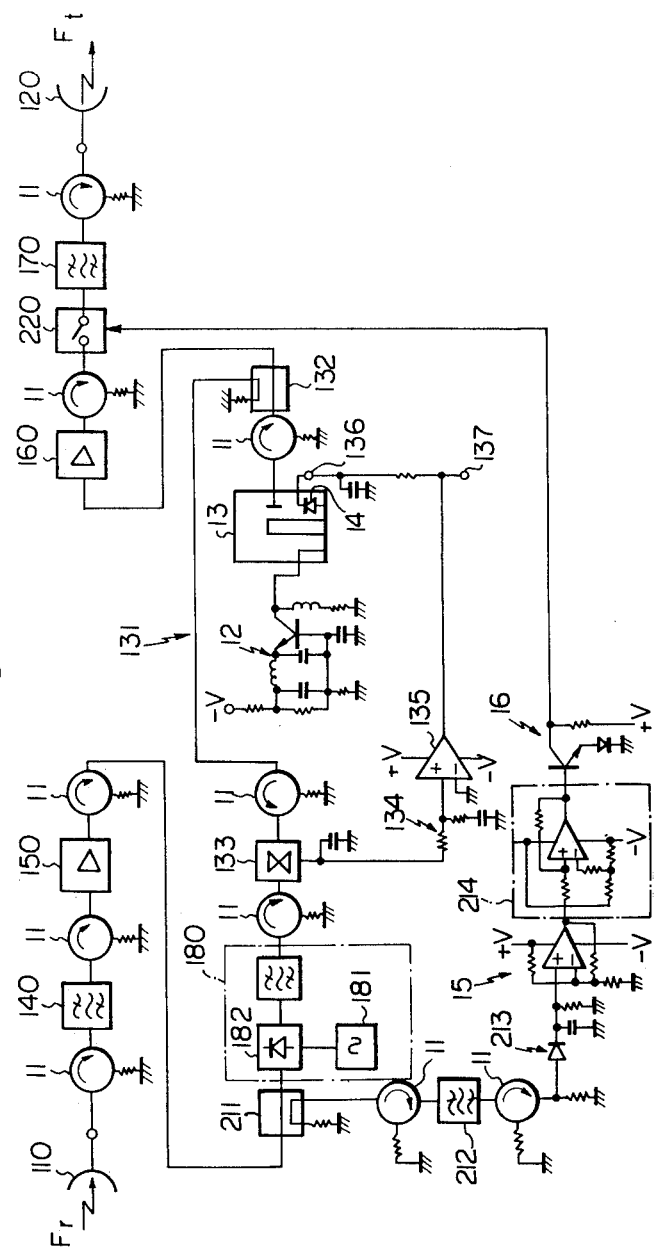
FIG. 7 is an example of a detailed circuit diagram corresponding to the block diagram illustrated in FIG. 2.

Referring to FIG. 7, there is illustrated an example of a detailed circuit diagram corresponding to the block diagram illustrated in FIG. 2. The members illustrated in FIG. 7 and members illustrated in FIG. 2 which are designated by the same numerals and symbols are identically the same. In FIG. 7, each reference numeral 11 represents a circulator, in which each arrow indicates a forward direction of a microwave to be transmitted. The voltage controlled oscillator 131 is comprised of a microwave oscillating circuit 12 and a cavity resonator 13 which has a varactor diode 14 therein. The phase comparator 133 is made of a balanced diode, such as MD-112-1, manufactured by ANZAC ELECTRONICS Co., Ltd. The loop filter 134 is comprised of a R-C circuit. The amplifier 135 is made of an operational amplifier. The rectifying diode 213 is connected to, at its output, a conventional amplifier 15 which has a Schmit trigger function. The reference numeral 16 designates a switching driver which causes the switching device 220 to be conductive or non-conductive.

Figure 8:
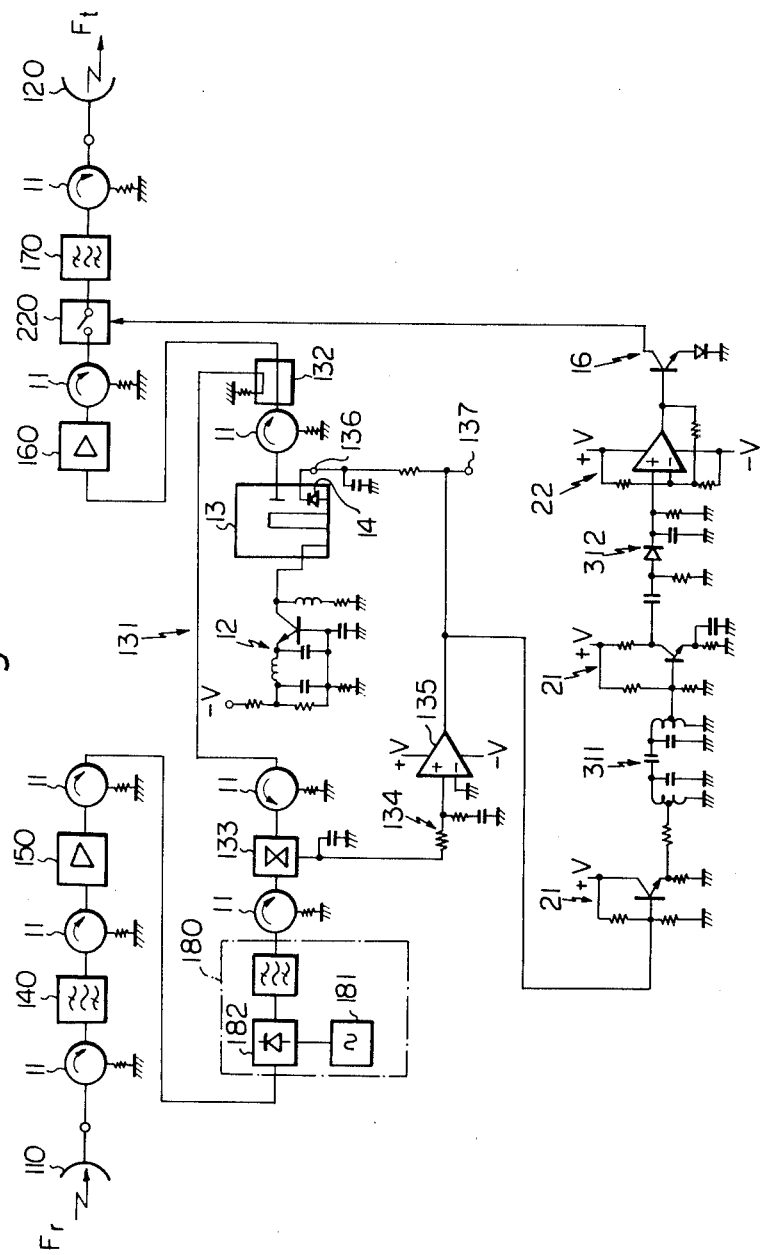
FIG. 8 is an example of a detailed circuit diagram corresponding to the block diagram illustrated in FIG. 3.

Referring to FIG. 8, there is illustrated an example of a detailed circuit diagram corresponding to the block diagram illustrated in FIG. 3. The pilot signal passing filter 311 is made of an L-C filter. Each reference numeral 21 represents a buffer amplifier. The reference numeral 22 represents an amplifier made of an operational amplifier. A switching driver 16 is the same as the switching driver 16 illustrated in FIG. 7.

Figure 9:
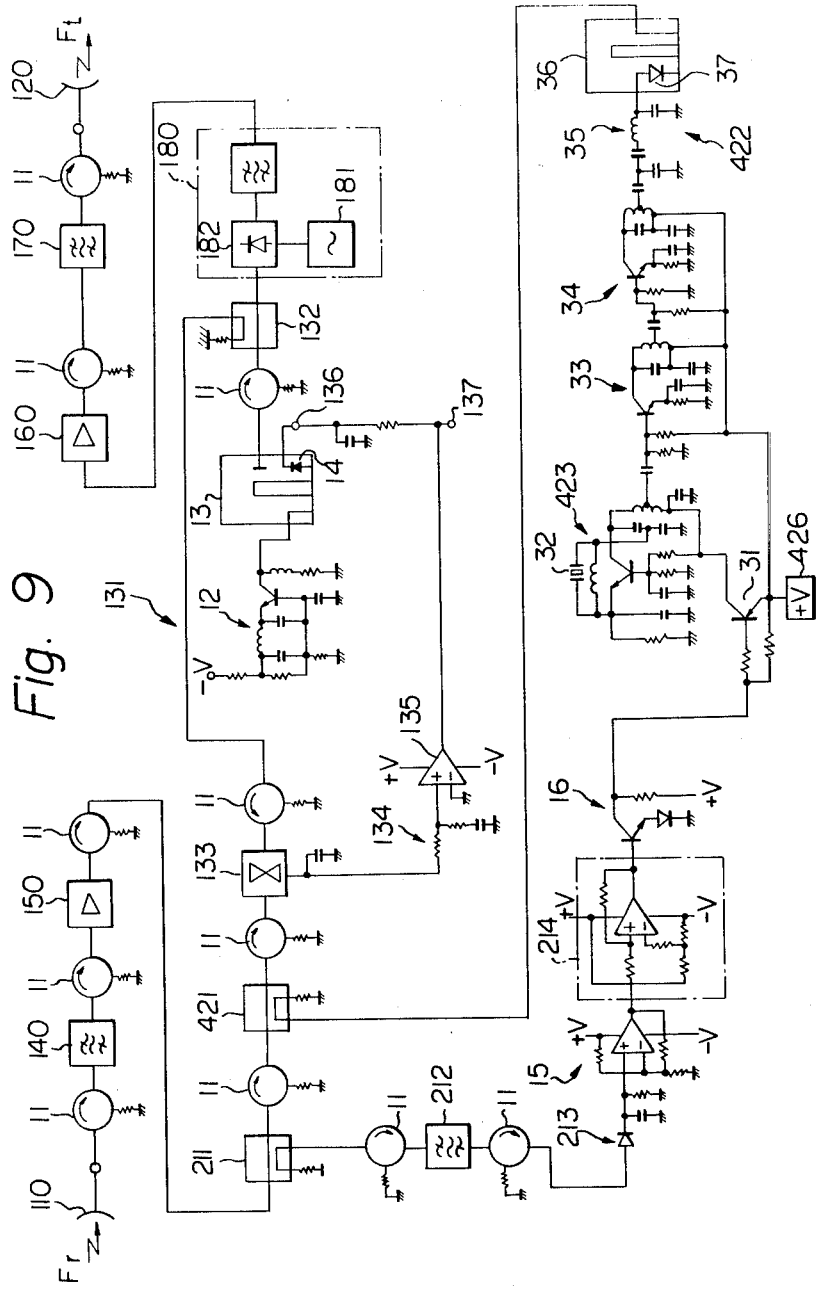
FIG. 9 is an example of a detailed circuit diagram corresponding to the block diagram illustrated in FIG. 4.

Referring to FIG. 9, there is illustrated an example a detailed circuit diagram corresponding to the block diagram illustrated in FIG. 4. A switching transistor 31 corresponds to the switch 425 in FIG. 4. The crystal oscillator 423 includes a crystal 32. The multiplier 422 is comprised of a L-C circuit 35 and a cavity resonator 36 which has a varactor diode 37 therein. The reference numerals 33 and 34 respresent amplifiers, respectively.

Figure 10:
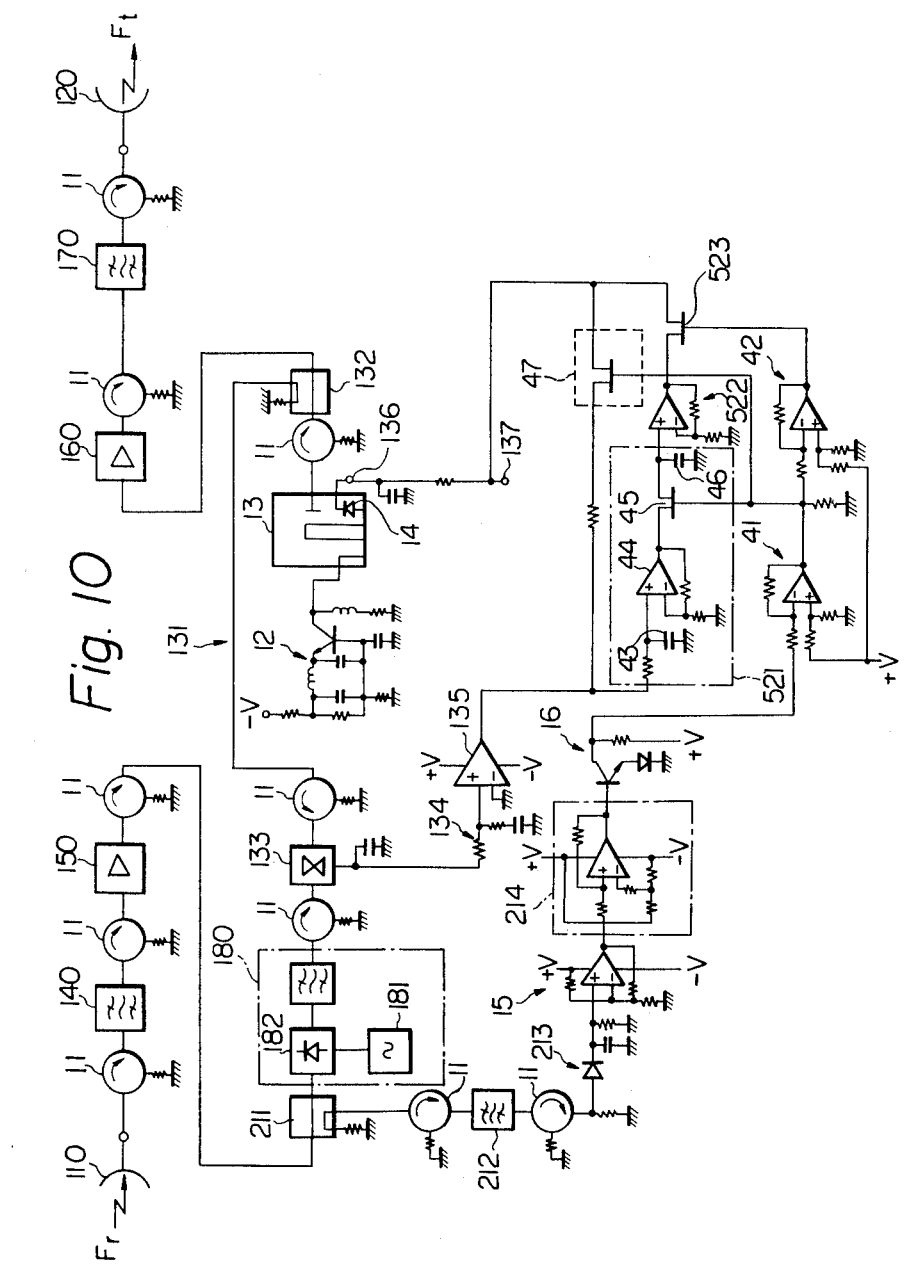

Referring to FIG. 10, there is illustrated an example of a detailed circuit diagram corresponding to the block diagram illustrated in FIG. 5. The reference numerals 41 and 42 represent a first inverter and a second inverter, respectively, which are not illustrated in FIG. 5. The first inverter 41 controls a normally-on switching FET 45. The second inverter 42 controls the normally-off switch 523. The fixed voltage generator 522 is made of an operational amplifier having very high input impedance. The voltage level memory 521 is comprised of an integration capacitor 43 for smoothing the output from the amplifier 135, a buffer amplifier 44, the switching FET 45, a capacitor 46 which maintains a voltage level applied through the FET 45 after the FET 45 becomes non-conductive. A switching FET 47 which is a normally-on switch, may be inserted, if necessary. The FET 47 is controlled by the first inverter 41.

Figure 11:
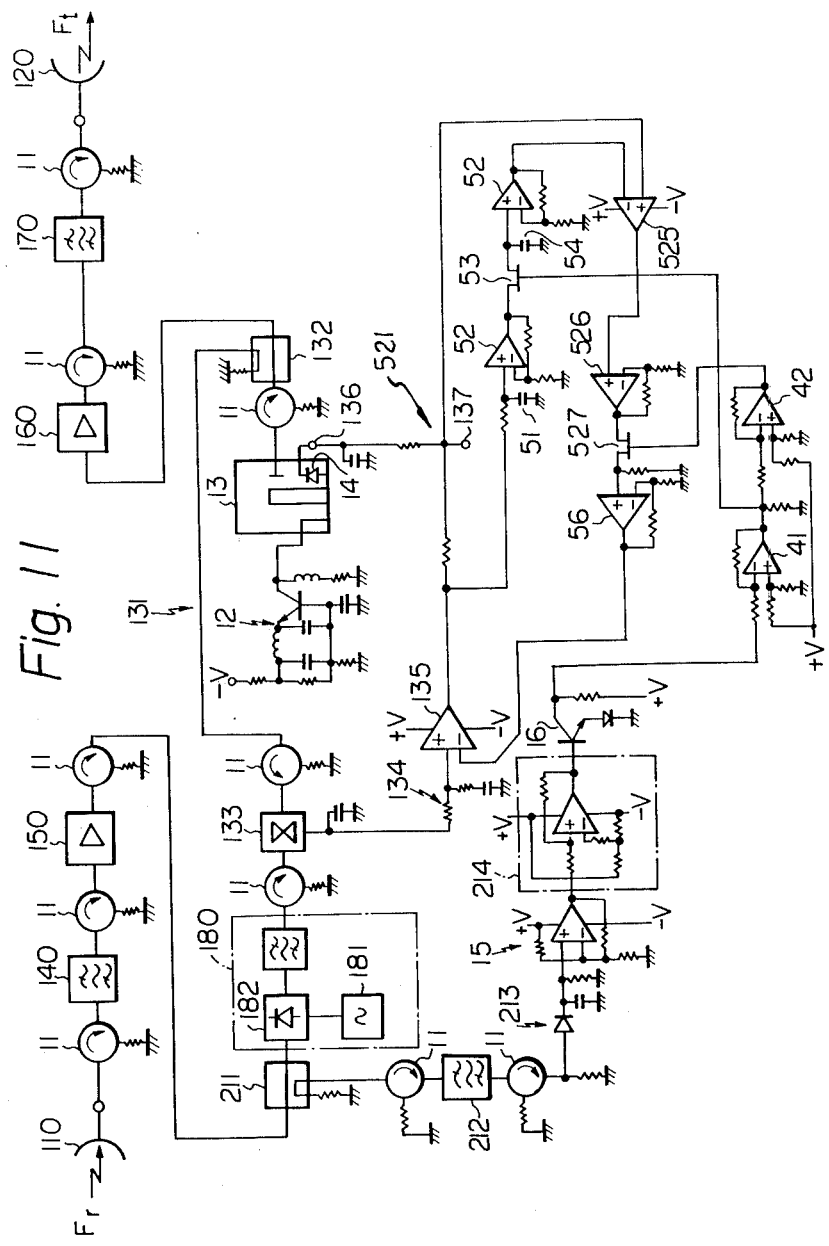
FIG. 11 is an example of a detailed circuit diagram corresponding to the block diagram illustrated in FIG. 6.

Referring to FIG. 11, there is illustrated an example of a detailed circuit diagram corresponding to the block diagram illustrated in FIG. 6. Inverters 41 and 42 correspond to those of illustrated in FIG. 10. The voltage level memory 521 is comprised of an integration capacitor 51, buffer amplifiers 52, a switching FET 53 which is a normally-on switch and is controlled by the first inverter 41, a capacitor 54 which maintains a voltage level applied through the FET 53 after the FET 53 becomes non-conductive. The voltage comparator 525 is made of an operational amplifier. The amplifier 526 is also made of an operational amplifier. The switch 527 is made of a switching FET and is controlled by the second inverter 42. The reference numeral 56 represents an amplifier which is connected to the low frequency amplifier 135.

As mentioned above, the straight-through-repeater according to the present invention can provide, in cheap and simple manner, various functions, such as (1) to produce baseband signals, (2) to obtain a high power amplifying capability, (3) to obtain a very narrow filtering capability, (4) to obtain an automatic gain controlling capability, (5) to obtain a level limiting capability, and (6) to suppress a step-out of synchronism occurring in the phase-locked loop circuit.

What is claimed is:

1. A straight-through-repeater for relaying a received frequency-modulated microwave signal after direct amplification thereof, wherein the straight-through-repeater includes a phase-locked loop circuit, comprising:

a voltage controlled oscillator;

a phase comparator, operatively connected to said voltage controlled oscillator, for comparing the phase of said received frequency-modulated microwave signal with the phase of a microwave output from said voltage controlled oscillator and for supplying a control signal representing the difference between said phases to said voltage controlled oscillator, wherein said microwave output from said voltage controlled oscillator is transmitted, as a relayed frequency-modulated microwave signal, from said straight-through-repeater; and a means, operatively connected to said phase-locked loop circuit, for suppressing a step-out of synchronism occurring in the phase-locked loop circuit, wherein said means for suppressing said step-out of synchronism comprises a means, operatively connected to receive said received frequency-modulated signal, for detecting a source signal which causes the occurrence of said step-out of synchronism and a means for preventing the transmission of an undesired microwave output from said voltage controlled oscillator due to the occurrence of said step-out of synchronism, said means for preventing the transmission of an undesired microwave output operatively controlled in dependence upon said means for detecting said source signal.

2. A repeater as set forth in claim 1, wherein said means for detecting said source signal comprises a level detector circuit for detecting a decrease in the level of said received frequency-modulated microwave signal.

3. A repeater as set forth in claim 2, wherein said level detector circuit comprises a band pass filter feeding a rectifier circuit which feeds a Schmitt trigger circuit.

4. A repeater as set forth in claim 1, wherein said means for detecting said source signal comprises a means for detecting the presence of a pilot signal in said received frequency-modulated microwave signal.

5. A repeater as set forth in claim 4, wherein said means for detecting the presence of said pilot signal comprises a pilot signal filtering means and a rectifier circuit operatively connected to said pilot signal filtering means, wherein said means for detecting the presence of a pilot signal receives an output from said phase comparator.

6. A repeater as set forth in claim 2 or 4, wherein said means for preventing the transmission of said undesired microwave output comprises a switching device operatively connected to said voltage controlled oscillator, wherein said switching device cuts off said undesired microwave signal generated by said step-out of synchronism.

7. A repeater as set forth in claim 1 or 2, wherein said means for preventing the transmission of the undesired microwave output comprises a microwave generator including a crystal oscillator, wherein said microwave generator supplies a microwave output to said phase comparator.

8. A repeater as set forth in claim 1 or 2, wherein said means for preventing the transmission of the undesired microwave output comprises a means for fixing the oscillating frequency of said voltage controlled oscillator at a constant frequency.

9. A repeater as set forth in claim 8, wherein said constant frequency equals the last oscillating frequency of said voltage controlled oscillator immediately before the time said level detector detects a decrease in the level of said received frequency-modulated microwave signal.

10. A repeater as set forth in claim 9, wherein said means for fixing the oscillating frequency of said voltage controlled oscillator comprises a means for supplying a constant voltage level to a voltage control terminal of said voltage controlled oscillator.

11. A repeater as set forth in claim 10, wherein said means for supplying a constant voltage level includes a voltage level memory circuit for storing the last voltage level appearing at said voltage control terminal immediately before the time said level detector circuit detects a decrease in the level of said received frequency-modulated microwave signal.

12. A repeater as set forth in claim 11, further comprising a voltage comparator, operatively connected between said voltage level memory circuit and said voltage control terminal, for comparing the output voltage level of said voltage level memory with the voltage level of said voltage control terminal and for producing a feedback control voltage, for controlling said controlled oscillator wherein said feedback control voltage maintains the voltage level of said voltage control terminal at a constant level.

13. A straight-through-repeater for relaying a received frequency-modulated microwave signal after direct amplification thereof, comprising:
  a phase-locked loop circuit comprising a voltage controlled oscillator having a microwave output, wherein said microwave output is transmitted, as a relayed frequency-modulated microwave signal, from said straight-through-repeater;
  a phase comparator, operatively connected to said voltage controlled oscillator, for comparing the phase of said received frequency-modulated microwave signal with the phase of the microwave output from said voltage controlled oscillator and for supplying a control signal to said voltage controlled oscillator representing the difference between the compared phases;
  a suppression means, operatively connected to said phase-locked loop circuit, for suppressing a stepout of synchronism occurring in said phase-locked loop circuit, wherein said suppression means comprises:
  a level detector circuit, operatively connected to receive said received frequency-modulated microwave signal, for detecting the occurrence of said stepout of synchronism, wherein said level detector circuit detects a decrease in the level of said received frequency-modulated microwave signal, and
  a preventing means, operatively connected to and controlled by said level detector circuit, for preventing the transmission of an undesired microwave signal from the microwave output of said voltage controlled oscillator, wherein said level detector comprises:
    a band pass filter circuit operatively connected to receive said received frequency-modulated microwave signal;
    a rectifier circuit operatively connected to said band pass filter circuit; and
    a hysteresis circuit operatively connected between said rectifier circuit and said preventing means.

14. A repeater as set forth in claim 13, wherein said hysteresis circuit is a Schmitt trigger circuit.

15. A straight-through-repeater as set forth in claim 13, wherein said phase-locked loop circuit comprises:
  a loop filter circuit operatively connected between said phase comparator and said voltage controlled oscillator;
  a low frequency amplifier circuit operatively connected between said loop filter circuit and said voltage controlled oscillator;
  a branching directional coupler operatively connected between the microwave output of said voltage controlled oscillator and one input of said phase comparator.

16. A repeater as set forth in claim 13, wherein said second means comprises a switching device which is operatively connected to said voltage controlled oscillator.

17. A repeater as set forth in claim 13, wherein said second means comprises:
  a mirowave generator, operatively connected to said first means, for supplying a microwave output to said phase comparator, wherein
  said microwave generator comprises a crystal oscillator, whereby a high voltage level dummy microwave is provided at the input of said phase comparator.

18. A repeater as set forth in claim 17, further comprising:
  a switching device, operatively connected between said crystal oscillator and said first means, for controlling the operation of said crystal oscillator in dependence upon said first means;
  a multiplier circuit operatively connected between said crystal oscillator and said phase comparator, for multiplying the frequency of said microwave output of said crystal oscillator;
  a directional coupler, operatively connected between said multiplier and said phase comparator, for feeding the output of said multiplier to said phase comparator.

19. A repeater as set forth in claim 13, wherein said second means comprises a constant frequency means, operatively connected to said voltage controlled oscillator, for fixing the oscillating frequency of said voltage controlled oscillator at a constant frequency.

20. A repeater as set forth in claim 19, wherein said constant frequency equals the oscillating frequency of said voltage controlled oscillator immediately prior to the time said level detector circuit detects a decrease in the level of said received frequency-modulated microwave signal.

21. A repeater as set forth in claim 20, wherein said constant frequency means comprises a constant voltage means for supplying a constant voltage level to a voltage control terminal of said voltage controlled oscillator.

22. A repeater as set forth in claim 21, wherein said constant voltage means comprises a voltage level memory circuit, operatively connected to said phase comparator, said voltage control terminal and said first means, for storing the voltage level at said voltage control terminal immediately prior to the time said level detector circuit detects a decrease in the level of said received frequency-modulated microwave signal.

23. A repeater as set forth in claim 22, further comprising:
  a fixed voltage generator operatively connected between said voltage level memory circuit and said voltage control terminal;

a switching device operatively connected between said fixed voltage generator and said voltage control terminal.

24. A repeater as set forth in claim 22, further comprising:
   a voltage comparator circuit, operatively connected to said voltage level memory circuit and said voltage control terminal, for comparing the output voltage level of said voltage level memory circuit with the voltage level at said voltage control terminal and for producing a control voltage equal to the difference between the compared voltage levels;
   feed-back means, operatively connected between said voltage comparator circuit and said phase comparator, for maintaining the voltage level of said voltage control terminal constant, said feed-back means operatively connected to the output of said phase comparator.

25. A straight-through-repeater for relaying a received frequency-modulated microwave signal after direct amplification thereof, wherein the straight-through-repeater includes a phase-locked loop circuit, comprising:
   a frequency shifter for shifting the carrier frequencies of said received frequency-modulated microwave signal such that the carrier frequency of said received frequency-modulated microwave signal is different from the carrier frequency of a microwave signal to be transmitted from the straight-through-repeater;
   a voltage controlled oscillator;
   a phase comparator operatively connected between said frequency shifter and said voltage controlled oscillator, for comparing the phase of the frequency-modulated microwave signal at the output of said frequency shifter with the phase of a microwave output from said voltage controlled oscillator and for supplying a control signal representing the difference between said phases to said voltage controlled oscillator, wherein said microwave output from said voltage controlled oscillator is transmitted, as a relayed frequency-modulated microwave signal, from said straight-through-repeater; and
   a means, operatively connected to said phase-locked loop circuit, for suppressing a step-out of synchronism occurring in the phase-locked loop circuit, wherein said means for suppressing said step-out of synchronism comprises a means, operatively connected to receive said received frequency-modulated signal, for detecting a source signal which causes the occurrence of said step-out of synchronism and a means for preventing the transmission of an undesired microwave output from said voltage controlled oscillator due to the occurrence of said step-out of synchronism, said means for preventing the transmission of an undesired microwave output operatively controlled in dependence upon said means for detecting said source signal.

26. A straight-through-repeater for relaying a received frequency-modulated microwave signal after direct amplification thereof, comprising:
   a phase-locked loop circuit comprising a voltage controlled oscillator having a microwave output, wherein said microwave output is transmitted, as a relayed frequency-modulated microwave signal, from said straight-through-repeater;
   a phase comparator, operatively connected to said voltage controlled oscillator, for comparing the phase of said received frequency-modulated microwave signal with the phase of the microwave output from said voltage controlled oscillator and for supplying a control signal to said voltage controlled oscillator representing the difference between the compared phases;
   a suppression means, operatively connected to said phase-locked loop circuit, for suppressing a step-out of synchronism occurring in said phase-locked loop circuit, wherein said suppression means comprises a pilot means, operatively connected to receive said received frequency-modulated microwave signal, for detecting the occurrence of said step-out of synchronism by detecting the presence of a pilot signal in said received frequency-modulated microwave signal, and a preventing means, operatively connected to and controlled by said pilot means, for preventing the transmission of an undesired microwave signal from the microwave output of said voltage controlled oscillator.

27. A repeater as set forth in claim 26, wherein said pilot means receives an output from said phase comparator and wherein said pilot means comprises:
   a pilot signal filtering means operatively connected to said phase comparator, and
   a rectifier circuit operatively connected between said pilot filter means and said preventing means.

* * * * *

UNITED STATES PATENT AND TRADEMARK OFFICE
CERTIFICATE OF CORRECTION

PATENT NO. : 4,253,191

DATED : February 24, 1981

INVENTOR(S) : TAKURO OGUICHI

It is certified that error appears in the above—identified patent and that said Letters Patent is hereby corrected as shown below:

```
Front Page, [73], Assignee, "Tokyo" should be --Kanagawa--.
Col. 1, line 9, after "relays" insert --a--;
        line 28, after "in" insert --the--.
Col. 5, line 38, "cause" should be --causes--;
        line 57, "corresponsing" should be --corresponding--.
Col. 6, line 8, after "130" delete ",";
        line 49, after "level" delete ",".
Col. 7, line 2, "envelop" should be --envelope--;
        line 38, "Straight-" should be --straight- --;
        line 67, after "with" insert --a--.
Col. 8, line 4, after "when" insert --the--.
Col. 9, line 17, after "distortion" delete ",";
        line 29, after "130" delete ",";
        line 56, after "While" delete ",".
Col. 11, line 11, after "example" insert --of--;
         line 40, after "those" delete "of";
         line 55, "cheap" should be --an inexpensive--.
Col. 14, line 35, after ";" insert --and--;
         line 68, after ";" insert --and--.
Col. 15, line 12, after ";" insert --and--.
```

Signed and Sealed this

First Day of December 1981

[SEAL]

Attest:

GERALD J. MOSSINGHOFF

Attesting Officer  Commissioner of Patents and Trademarks